(12) United States Patent
Macchiarella (10) Patent No.: US 11,161,650 B2
(45) Date of Patent: Nov. 2, 2021

(54) OIL INJECTION ADAPTER AND SYSTEM

(71) Applicant: Kimberly Dawn Macchiarella, Hammond, IN (US)

(72) Inventor: Kimberly Dawn Macchiarella, Hammond, IN (US)

( * ) Notice: Subject to any disclaimer, the term of this patent is extended or adjusted under 35 U.S.C. 154(b) by 761 days.

(21) Appl. No.: 15/720,649

(22) Filed: Sep. 29, 2017

(65) Prior Publication Data

US 2018/0086506 A1 Mar. 29, 2018

Related U.S. Application Data

(60) Provisional application No. 62/401,432, filed on Sep. 29, 2016.

(51) Int. Cl.
*F16N 3/02* (2006.01)
*B65D 25/48* (2006.01)
*B65D 83/28* (2006.01)
*F16N 3/04* (2006.01)
*B65D 83/30* (2006.01)

(52) U.S. Cl.
CPC ............ *B65D 25/48* (2013.01); *B65D 83/28* (2013.01); *B65D 83/30* (2013.01); *F16N 3/02* (2013.01); *F16N 3/04* (2013.01)

(58) Field of Classification Search
None
See application file for complete search history.

(56) References Cited

U.S. PATENT DOCUMENTS

2006/0006194 A1* 1/2006 Niggemyer ............ B65D 25/48
222/107

* cited by examiner

*Primary Examiner* — Shamim Ahmed
*Assistant Examiner* — Bradford M Gates
(74) *Attorney, Agent, or Firm* — Wood, Phillips, Katz, Clark & Mortimer

(57) ABSTRACT

The invention disclosed herein is a system for dispensing storage or fogging oil into the cylinders of internal combustion engines prior to putting the engines up for storage, during storage, or when removing the engine from storage. The system includes a dispensing adapter for closing off the spark plug hole of an engine cylinder, the dispensing adapter including threads of different sizes and diameters to accommodate common spark plug thread sizes. The dispensing adapter may also be used to temporarily plug a spark plug hole when a spark plug is removed from an engine.

13 Claims, 10 Drawing Sheets

OIL INJECTION ADAPTER AND SYSTEM

FIELD OF THE INVENTION

Fluid dispensing systems. More particularly, lubricating fluid dispensing systems to dispense storage or fogging oil into the cylinders of internal combustion engines prior to putting the engines up for storage, during storage, or when removing the engine from storage. The invention also pertains to plugs for spark plug holes of internal combustion engines.

BACKGROUND ART

Presently, fogging or storage oil is provided to a user in an aerosol can of a size suitable for multiple uses, typically a can containing 12 to 18 ounces of fluid. The can includes a nozzle at the top of the can and a dispensing tube or straw for insertion into the engine cylinder which the user desires to apply the fogging oil. In order to access the cylinder, the user removes the spark plug, sets it aside, inserts the dispensing tube into the spark plug hole, and presses down on the nozzle to dispense fogging oil or other desired fluid into the cylinder. This apparatus and method however are not without their drawbacks.

Removing the spark plug for a prolonged period of time allows contaminants such as dust, dirt, and other contaminants such as metals and other airborne particles to enter the engine cylinder. Such contaminants then scour vital engine parts such as the cylinder walls and rings, causing unneeded wear and damage to the engine. Additionally, the amount of fogging oil is not well regulated with the present application from a multi-use can. A user can apply too little fogging oil, or an excess of fogging oil. Too little fogging oil results in an unprotected engine, exposing the cylinder walls and other internal components to corrosion over a prolonged storage. An excess of fogging oil can lead to an oily mess on the exterior of the engine as the fogging oil bubbles out of the spark plug hole, and further poses a fire risk if not removed from the exterior of the engine. Additionally, excess oil within the cylinder may cause fluid lock of the cylinder.

The dispensing system disclosed herein can provide a closed system for dispensing the storage oil into the cylinder, thereby reducing the amount of contaminants introduced into the cylinder and inner workings of the engine. Additionally, the dispensing system disclosed here in is designed for one-time use. The system thereby provides a specific amount of fogging oil to the engine cylinder, eliminating both under and over application of fogging oil. The closed system described herein also is safer to use as there is no risk of the fogging oil escaping the cylinder through an open spark plug hole during application of the fogging oil.

The dispensing system further includes an adapter that is sized to accommodate popular sizes of spark plug holes, allowing the dispensing system to be used with a variety of internal combustion engines. Additionally, the dispensing system disclosed herein can be operated with one hand, and without the need to see into the cylinder to monitor the amount of fogging oil in the cylinder.

Further, there is a need to plug the spark plug hole of a cylinder when the spark plug is removed for other maintenance reasons. Presently, rags, towels, and paper are often times placed in the spark plug hole when the spark plug is removed. The use of these items can introduce contaminants that might have collected on the items themselves. The adapter of the present invention, with or without the other components of the system, can be used as a plug to close off the cylinder at the times a spark plug is removed. If one desires only a plug, the adapter of the present invention can be manufactured without the central aperture.

SUMMARY OF THE INVENTION

The dispensing system disclosed herein is a one-time use fogging oil application system. The system includes a fluid container, such as an aerosol can, squeeze bottle, or other liquid reservoir for holding and selectively expelling fluid, a dispensing tube, a dispensing adapter having a plurality of diameters, and multiple threads to accommodate a multiple of spark plug hole diameters and thread sizes. The dispensing adapter further includes a head nut or tool bearing surface, allowing the user to better grasp and turn with fingers, or apply a tool such as a wrench to assist in tightening or threading the dispensing adapter into or out of a threaded spark plug hole. Additionally, the dispensing tube includes a grip to facilitate axial movement of the dispensing tube by the user's fingers while holding the aerosol can or fluid container in the palm of the user's hand. The axial movement of the dispensing tube towards the can causes the dispensing valve on the top of the aerosol can to open, thereby expelling fluid into the dispensing tube.

Additionally, the grip can act as a stop, limiting axial movement of the dispensing adapter in a direction towards the fluid container. In such an embodiment, a user may hold the fluid container and push the fluid container and dispensing tube toward the dispensing adapter fixed in the cylinder, allowing the grip to contact the top of the dispensing, thereby limiting further axial movement of the dispensing tube. At such point, further pushing of the fluid container toward the dispensing adapter will result in opening of the valve and expression of fluid into the dispensing tube and cylinder. Once the cylinder is treated with fluid, the dispensing adapter may be removed from the spark plug hole, or it may remain in place, along with the dispensing tube or fluid container, to serve as an indicator that the cylinder has been prepared for storage.

The dispensing adapter of the present invention can also be used as a plug for the spark plug hole of a cylinder. The presence of different diameter and sizes of threads allows a single adapter to be used with various hole diameters and thread sizes used for different engines. When used as a plug, the dispensing adapter central aperture can be eliminated, as full closure of the cylinder is preferred.

In one form, the invention is directed to an assembly for dispensing a fluid. The assembly includes: a tube having a first end in fluid communication with a second end; a grip located on an exterior surface of the tube; and an adapter for placing the second end of the tube in fluid communication with an aperture. The grip has a portion that extends perpendicularly from an axis of the tube. The adapter has a first portion sized to fit a first diameter aperture, and a second portion to fit a second diameter aperture.

In one form, the grip is a disk that surrounds the tube.

In one form, the adapter first portion has a first set of threads. The second adapter portion has a second set of threads. The first set of threads has a diameter that is smaller than the second set of threads. The second set of threads are nearer the first end of the tube than the first set of threads.

In one form, the adapter includes a head nut. The head nut is located closer to the first end of the tube than the first set of threads.

In one form, the assembly further includes a container for expelling fluid. The container is in fluid communication with the first end of the tube.

In one form, the adapter includes an axial conduit for receiving the second end of the tube. The adapter has a first set of threads wound about an axis aligned with the axial conduit. The adapter further has a second set of threads wound about the axis aligned with the axial conduit.

In one form, the first set of threads are sized to be received by a first sparkplug hole of a first engine. The second set of threads are sized to be received by a second sparkplug hole of a second engine.

In one form, the container contains oil. The amount of oil corresponds to the amount of oil needed to prepare a cylinder of the first engine for storage.

In one form, the adapter is in sealing engagement with the first sparkplug hole of the first engine when threaded into the first sparkplug hole of the first engine.

In another form, the invention is directed to an assembly for the dispensing of a fluid. The assembly includes a container for selectively expelling a fluid, a fluid conduit in fluid communication with the container, and an adapter in fluid communication with the fluid conduit and having an outlet for expelling fluid. The adapter includes a first threaded portion and a second threaded portion.

In one form, the first threaded portion is threaded to fit a first sparkplug hole of a first engine. The second threaded portion is threaded to fit a second sparkplug hole of a second engine.

In one form, the assembly further includes a grip positioned about the fluid conduit. The grip includes a protrusion extending radially from the fluid conduit.

In one form, the adapter includes a head nut. The head nut has a boss extending radially from the head nut.

In one form, the adapter has a third threaded portion. The third threaded portion is threaded to fit a third sparkplug hole on a third engine. The first, second, and third threaded portions are axially aligned.

In one form, the first, second, and third threaded portions are external threads.

In one form, the invention is directed to a method of preparing an engine for storage. The method includes the steps of: providing a plurality of fluid containers; providing a plurality of threaded adapters; threading an adapter into a first sparkplug hole of the engine; dispensing the fluid from a first container into the engine; selecting a second adapter from the remaining plurality of adapters; dispensing fluid from a second container into a second cylinder of the engine; and dispensing fluid from a second container into a second cylinder of the engine. Each container contains the amount of fluid desired for preparing a cylinder of the engine for storage. Each adapter is in fluid communication with one of the plurality of fluid containers. Each threaded adapter includes a first threaded portion having a first set of threads and a second portion having a second set of threads.

In one form, the method further includes the steps of retaining the first adapter in the first spark plug hole and retaining the second adapter in the second spark plug hole to indicate that the engine has been prepared for storage.

In one form, the method further includes the steps of: providing a tool for receiving the first adapter and first container, placing the first adapter and first container into the tool prior to threading the first adapter into the first sparkplug hole; preventing contamination of the engine by withdrawing the first adapter and first container from the tool after the first adapter is threaded into the first sparkplug hole; and leaving the first adapter in the first sparkplug hole.

In one form, the method further includes the steps of: placing the second adapter and second container into the tool prior to threading the second adapter into the second sparkplug hole of the engine; preventing contamination of the engine by withdrawing the second adapter and second container from the tool after the second adapter is threaded into the second sparkplug hole; and leaving the second adapter in the second sparkplug hole.

DETAILED DESCRIPTION OF THE PREFERRED EMBODIMENT

Figures 1, 2:
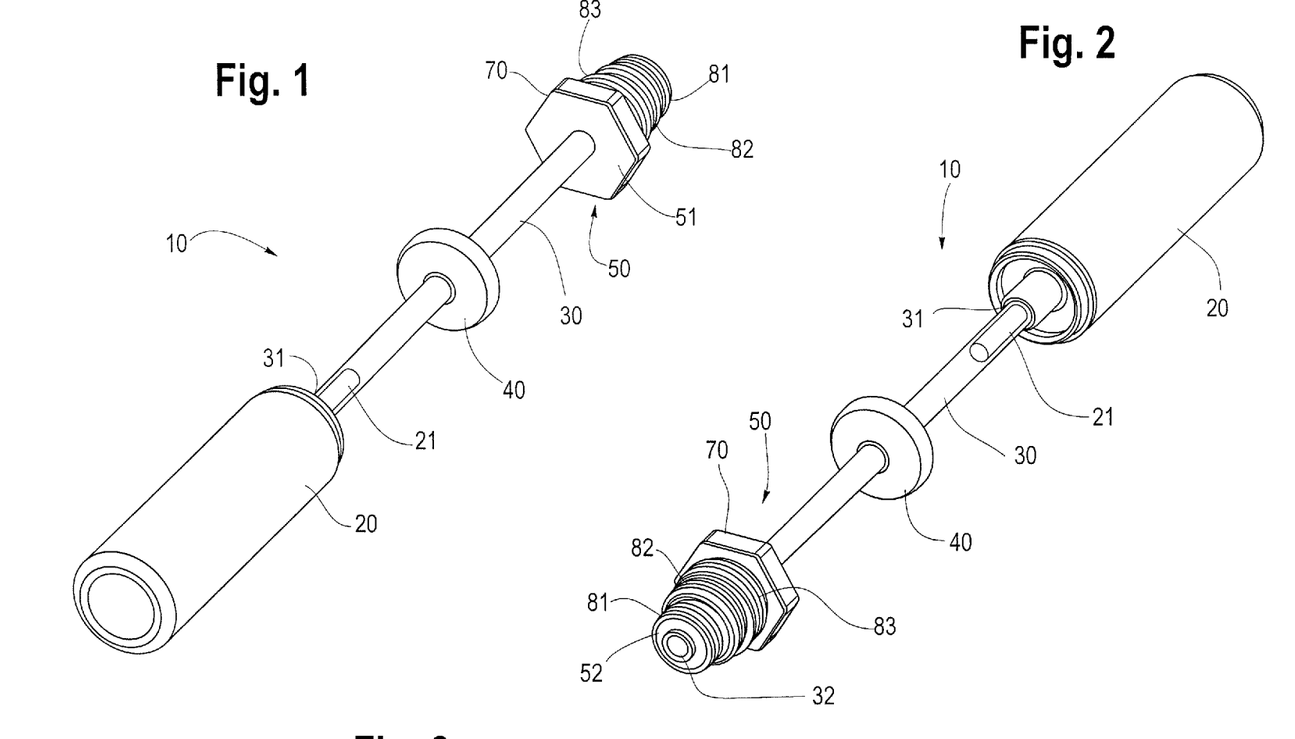
FIG. 1 is a perspective view of the fluid dispensing system.
FIG. 2 is a perspective view of the fluid dispensing system; the view being taken from the opposite direction of FIG. 1.
Figure 3:
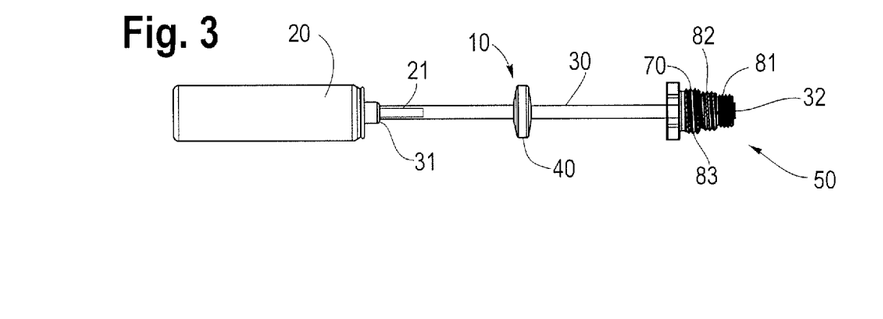
FIG. 3 is a side elevation view of the fluid dispensing system.

With reference to FIGS. 1, 2 and 3, the dispensing system 10 includes a fluid container 20 for containing and dispensing a fluid. In the preferred embodiment the fluid is fogging or storage oil intended for an internal combustion engine. The fluid container 20 is typically an aerosol can containing the fluid to be dispensed, along with a propellant, allowing the fluid to be expelled from a nozzle or other orifice on the can or fluid container 20. In the preferred embodiment shown in the figures, the fluid container 20 includes a valve 21 to selectively dispense or expel fluid from the fluid container 20.

The fluid dispensing system 10 further includes a dispensing tube 30 having a first end 31 and a second end 32. The dispensing tube 30 includes a wall 34 defining an inner conduit 35. In operation, the dispensing tube 30 communicates fluid from its first end 31 to its second end 32 along or through the inner conduit 35. In the most preferred embodiment, the dispensing tube 30 is constructed of plastic. However, one skilled in the art will recognize that the dispensing tube 30 may be constructed of any material that allows communication of the fluid from the first end 31 to the second end 32 of the dispensing tube 30.

As shown in FIGS. 1 through 5, the first end 31 of the dispensing to is in fluid communication with the valve 21 of the fluid container 20, allowing fluid from the fluid container 20 to flow through the inner conduit 35 and out of the second end 32. In some embodiments, such as the one shown in the figures, the dispensing tube 30 is co-axially aligned with the valve 21. In other embodiments, the dispensing tube 20 may be aligned in other orientations with the valve 21, or other structures that allow fluid to be communicated or dispensed from the fluid container 20 to the dispensing tube 30.

The dispensing tube 30 can include a grip 40 positioned on the outside of the dispensing tube 30. In the most preferred embodiment shown in the figures, the grip 40 is a disk positioned about the dispensing tube 30. The grip 40 thereby presents surfaces to which a user may apply force to displace the dispensing tube in an axial direction. In the most preferred embodiment, the grip 40 is of a diameter that is less than the diameter of the fluid container 20, thereby allowing a long deep-well socket tool to fit over both the fluid container 20 and the grip 40 in order to engage the nut head or tool bearing surfaces 70. The grip 40 includes a central aperture 41 through which the dispensing tube 30 fits.

In the most preferred embodiment, the grip 40 is positioned approximately at the midpoint between the first end 31 and the second and 32 of the dispensing tube. In other embodiments, the grip may be positioned along the length of the dispensing tube 30 at a position that is a convenient distance from the fluid container 20. For instance, the grip 40 may be positioned approximately 1 to 3 inches from the fluid container 20, allowing a user to hold the fluid container 20 in the user's palm, and allowing the user to this place the tips of his or her fingers on the grip 40 and displace the dispensing tube 30 towards the fluid container 20, thereby activating the valve 21 and dispensing fluid from the fluid container 20.

In the most preferred embodiment, the grip 40 is fixed on the dispensing tube 30 and is not free to move axially along the dispensing tube 30. In the most preferred embodiment, the grip 40 is fixed in position by crimping or otherwise expanding the wall 34 of the dispensing tube 30 on either side of the grip 40 to create a protrusion or other obstacle of sufficient height above the wall 35 to prevent the grip 40 from sliding along the length of the dispensing tube 30. In other embodiments, the grip may be positioned by friction fit, adhesives, or other mechanical means known in the art.

In other embodiments, the grip 40 need not be a circular disk. The grip 40 may be a tab, flange, extension, bar, or any other structure or protrusion placed outwardly from the wall 34 of the dispensing tube 30 that allows the user to grip or otherwise apply force with the user's fingers to move the dispensing tube 30 axially towards the fluid container 20 to activate nozzle 21 to dispense fluid.

In an alternate embodiment, the grip 40 may be positioned as a fluid conduit, rather than being positioned about the dispensing tube 30. With reference to FIGS. 6,7, and 22-27, the grip 40 includes a fluid conduit 45, placing a grip first end 46 in fluid communication with grip second end 47. The grip first end 46 is in fluid communication with the valve 21 of the container 20. The grip second end 47 is in fluid communication with the dispensing tube 30 first end 31. The grip second end 47 may include barbs 48 to secure the connection between the grip second end 47 and the first end 31 of the dispensing tube 30.

Figures 22, 23, 24:
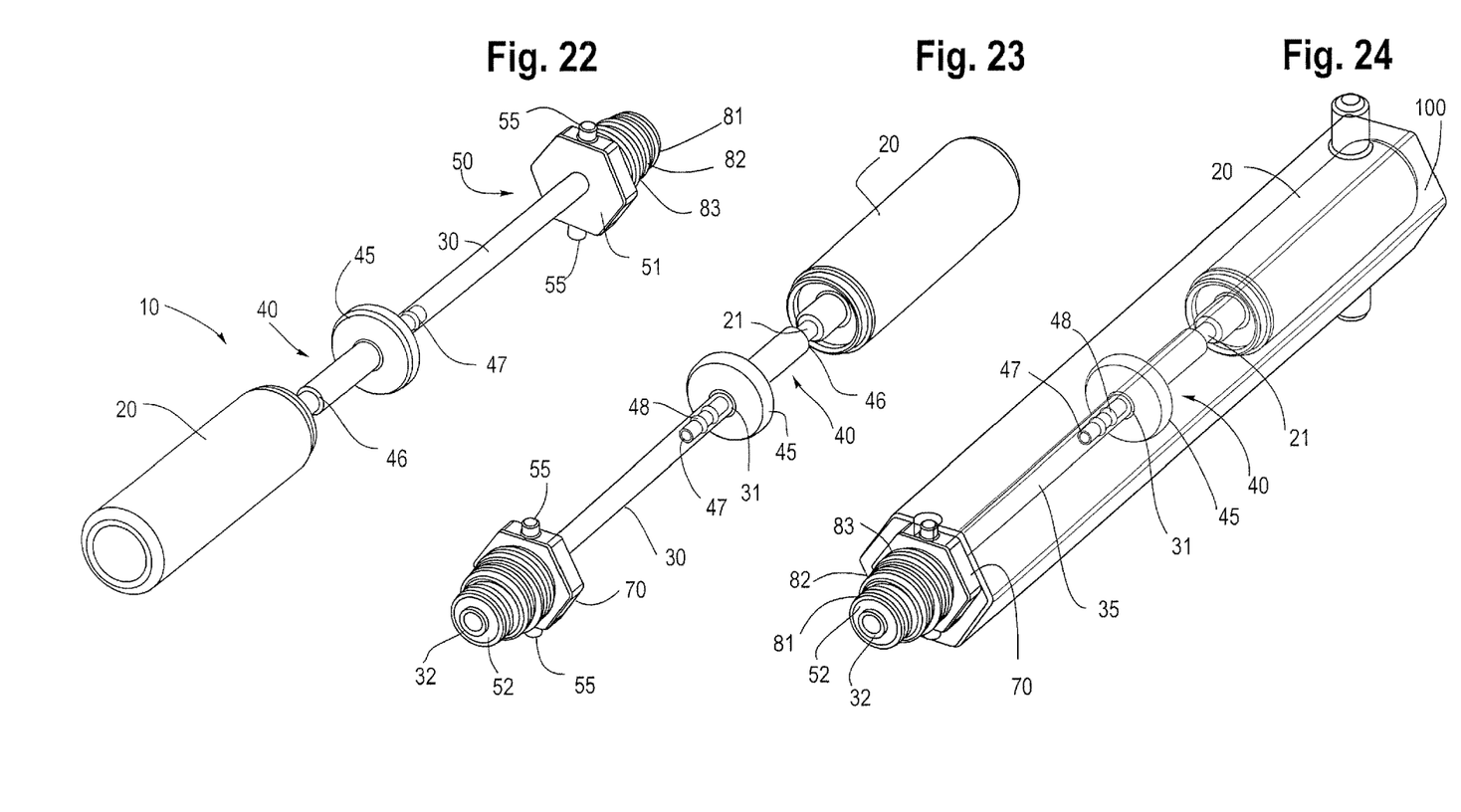
FIG. 22 is perspective view of an alternate embodiment of the fluid dispensing system.
FIG. 23 is a perspective view of the alternate embodiment of the fluid dispensing system; the view being taken from the opposite direction of FIG. 23.
FIG. 24 is a perspective view of the alternate embodiment of the fluid dispensing system; the system placed within a tool for use with the system.
Figure 25:
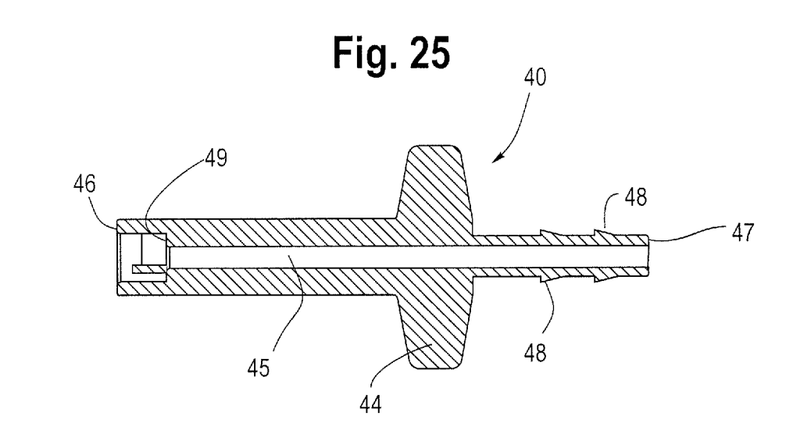
FIG. 25 is a side cross-sectional view of an alternate embodiment of the grip used with the fluid dispensing system.
Figure 26:
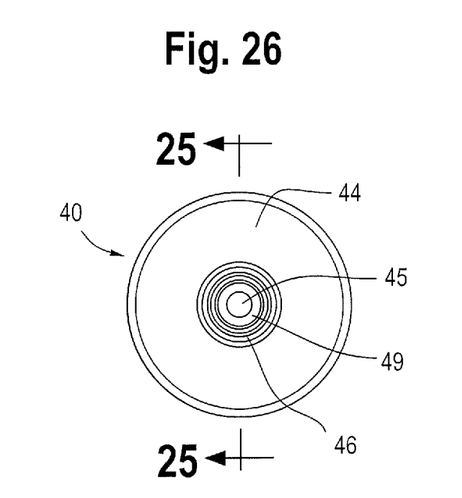
FIG. 26 is front view of an alternate embedment of the grip used with the fluid dispensing system.
Figure 27:
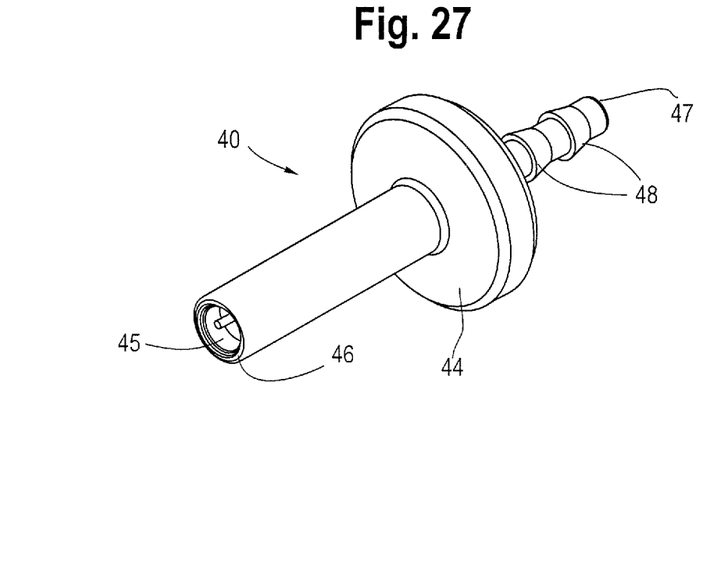
FIG. 27 is a perspective view of an alternate embedment of the grip used with the fluid dispensing system.

The grip first end 46 may include a flange 49 or other structure to prevent the grip first end 46 from sliding too far onto the valve 21 of the container 20. With such a connection, the user of the device may activate the valve 21 by holding the container 20 in one hand and grasping the grip 40 with fingers of the same hand, and axially displacing the grip 40 towards the container 20. The flange 49 thus pushes against the valve 21 and fluid is dispensed. It is preferred that the grip include a protrusion 44 to allow the user to apply the axial force. The protrusion 44 may be a tab, flange, disk, or other device that extends away from the fluid conduit 45. In the most preferred embodiment, the protrusion 44 should not radially extend beyond the diameter of the container 20, thus allowing the container 20 and grip 45 to fit within a tool 100, as shown in FIG. 24. The protrusion 44 is preferably located between 1 and 3 inches from the grip first end 46, to allow the user's fingers to reach the protrusion 44 when the container 20 is held by the user.

In a preferred embodiment, the dispensing system 10 includes a dispensing adapter 50 attached about the second end 32 of the dispensing tube 30. The dispensing adapter 50 may be made of any material that can be formed or machined. In is preferred that the dispensing adapter 50 is made of plastic. It is also preferred that the dispensing adapter is made of a material that is softer than the threads present in the spark plug hole, so as to limit the risk of damaging the threads of the spark plug hole.

As shown in FIGS. 4 through 9, the dispensing adapter 50 has a series of generally circular sections of different diameters. Each section includes an outward facing cylindrical wall, preferably with threads. The dispensing adapter 50 has a top 51 and a bottom 52. The bottom 52 is closer to the second end 32 of the dispensing tube 30 when the dispensing adapter 50 is attached to the dispensing tube 30.

The dispensing adapter 50 has a plurality of threaded sections or portions that increase in diameter going from the bottom 52 of the dispensing adapter 50 towards the top 51 of the dispensing adapter 50. Such varying threaded portions are to accommodate various sized spark plug holes or apertures in an internal combustion engine.

As shown in FIGS. 6 through 9, dispensing adapter 50 includes a first threaded portion 81 having a first diameter. The first threaded portion 81 is axially aligned with a second threaded portion 82 having a second diameter. The second threaded portion 82 is axially aligned with a third threaded portion 83 having a third diameter. In addition to having a diameter different from another threaded portion, a threaded portion may have threads of different specifications. In the most preferred embodiment the threads cooperate with threads on spark plug apertures of internal combustion engines. In the most preferred embodiment, the threaded portions have a diameter and thread specification to correspond to the three most common size spark plug holes. One skilled in the art will recognize that the invention is not limited to any particular number of threaded portions, although three are shown in the drawings.

Figure 16:
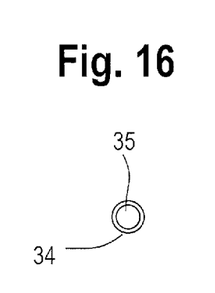
FIG. 16 is a top view of the dispensing tube.
Figure 17:
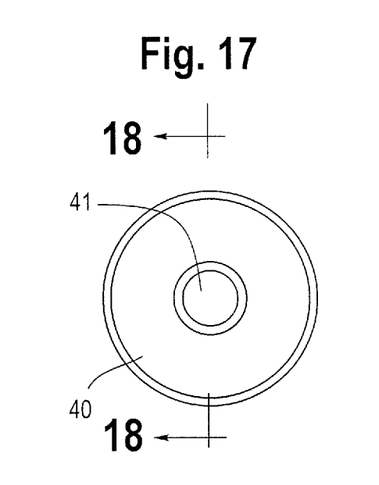
FIG. 17 is a front view of the grip.
Figure 18:
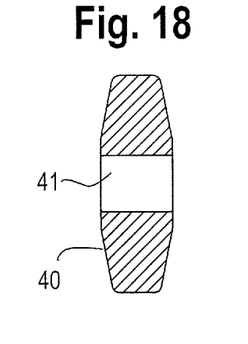
FIG. 18 is a side cross-sectional view of the grip.
Figure 19:
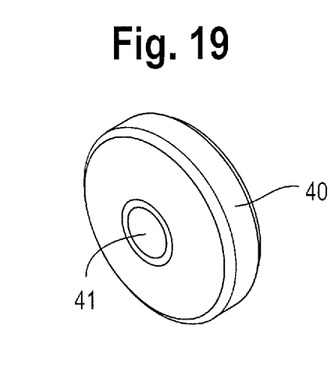
FIG. 19 is a perspective view of the grip.
Figure 20:
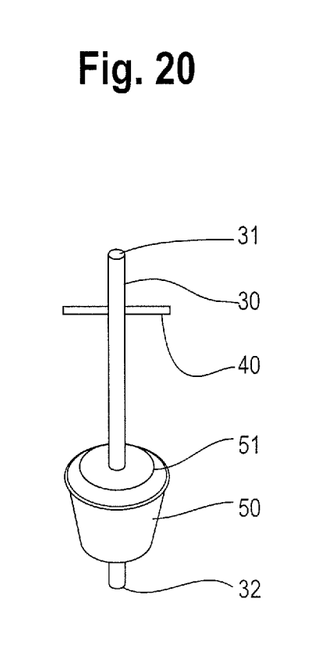
FIG. 20 is an alternate embodiment of the dispensing system using a tapered dispensing adapter without threads.
Figure 21:
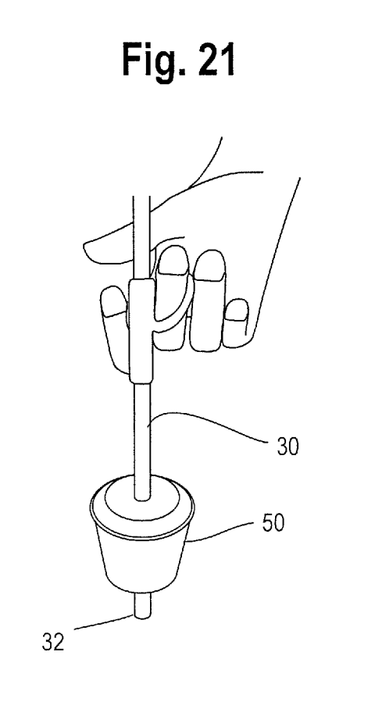
FIG. 21 is an alternate embodiment of the dispensing system using an inflatable or expanding dispensing adapter.

In other embodiments, the dispensing adapter 50 need not include threaded portions. In other embodiments, as shown in FIG. 16, the dispensing adapter 50 may have a taper from the top 51 to the bottom 52, allowing the dispensing adapter 50 to fit many different sized holes varying between the diameter of the diameter of the top 51 and the bottom 52 of the dispensing adapter 50. In another embodiment shown in FIG. 17, the dispensing adapter may be an inflatable structure or balloon, that can inflate to different diameters to seal the dispensing tube 30 in the spark plug holes of different diameters.

In other embodiment such as those shown in FIGS. 6, 7, and 22-24, the adapter 50 may include a boss 55. The boss 55 extends radially from the adapter 50, and generally extends beyond the tool bearing surfaces 70. The boss 55 may vary in number, and are most preferably tw, located 180 degrees apart. The boss 55 prevents the tool 100 from sliding past the adapter 50.

Figure 4:
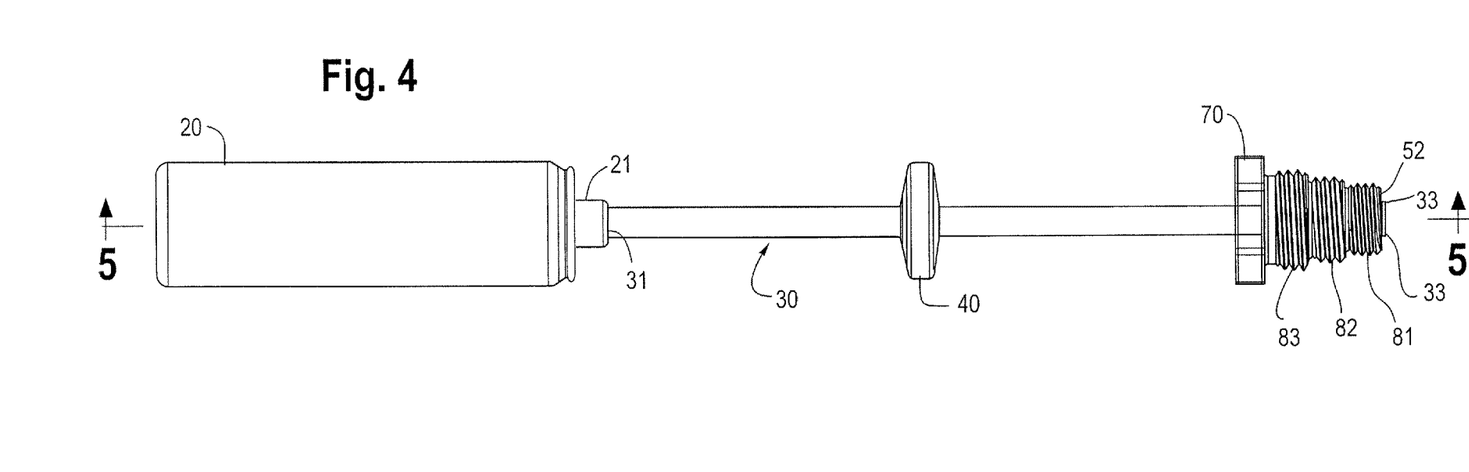
FIG. 4 is a side elevation view of the fluid dispensing system.
Figure 5:
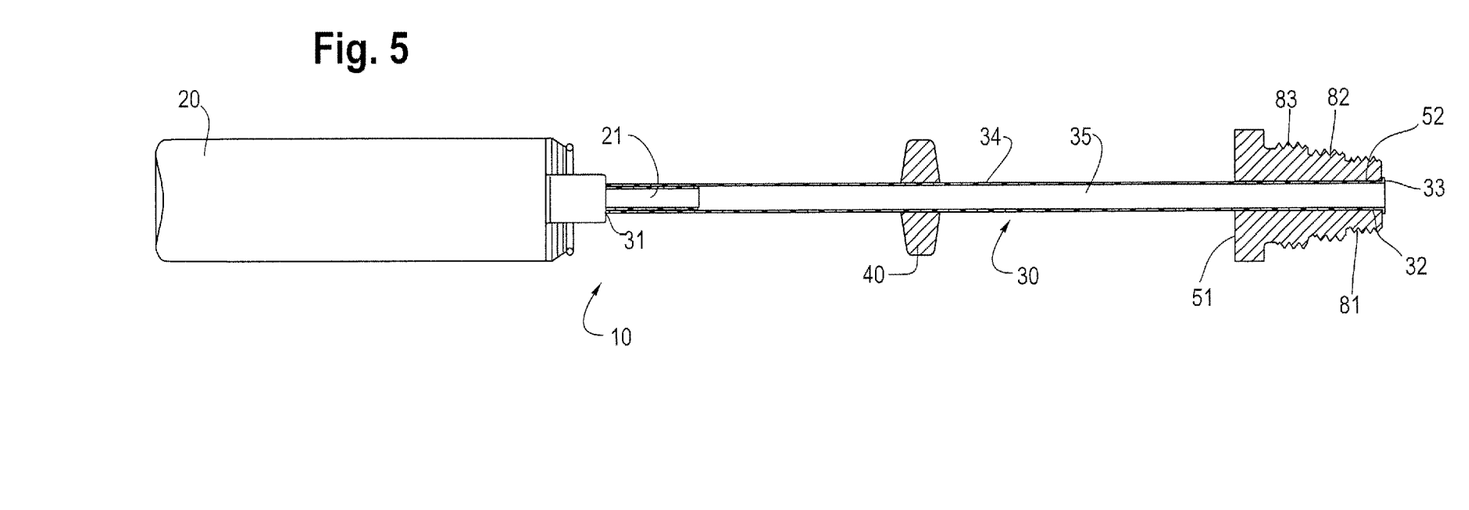
FIG. 5 is a cross-sectional side elevation view of the fluid dispensing system.
Figure 6:
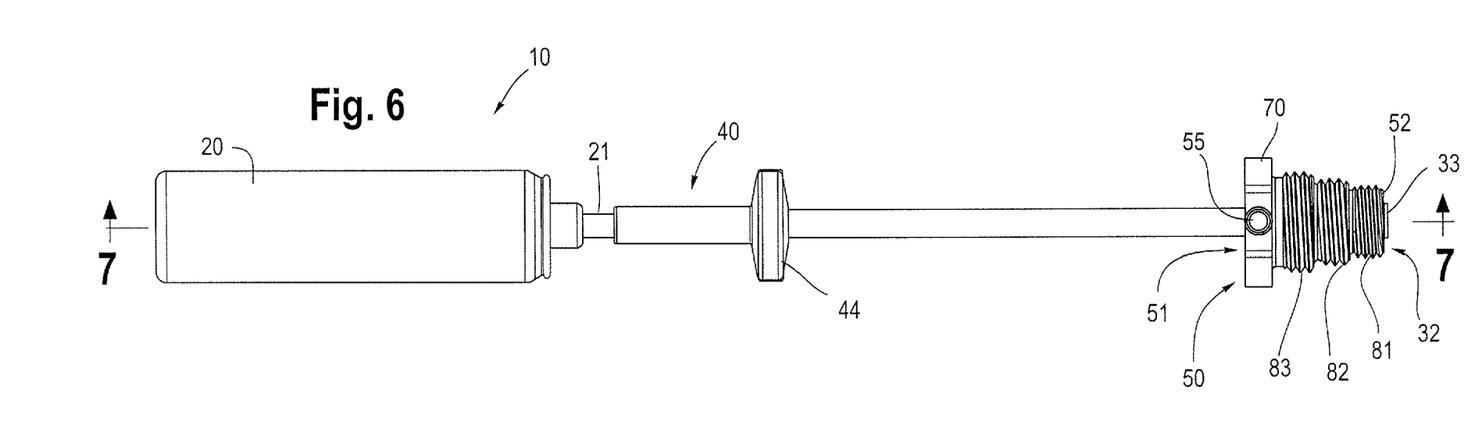
FIG. 6 is a side elevation view of an alternate embodiment of the fluid dispensing system.
Figure 7:
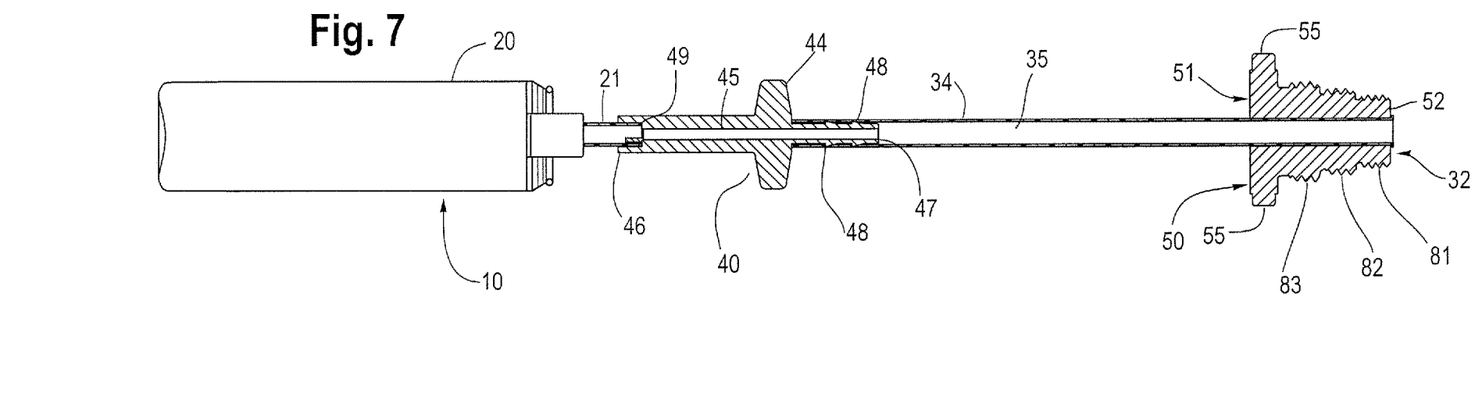
FIG. 7 is a cross-sectional side elevation view of an alternate embodiment of the fluid dispensing system.
Figures 8, 10A, 11:
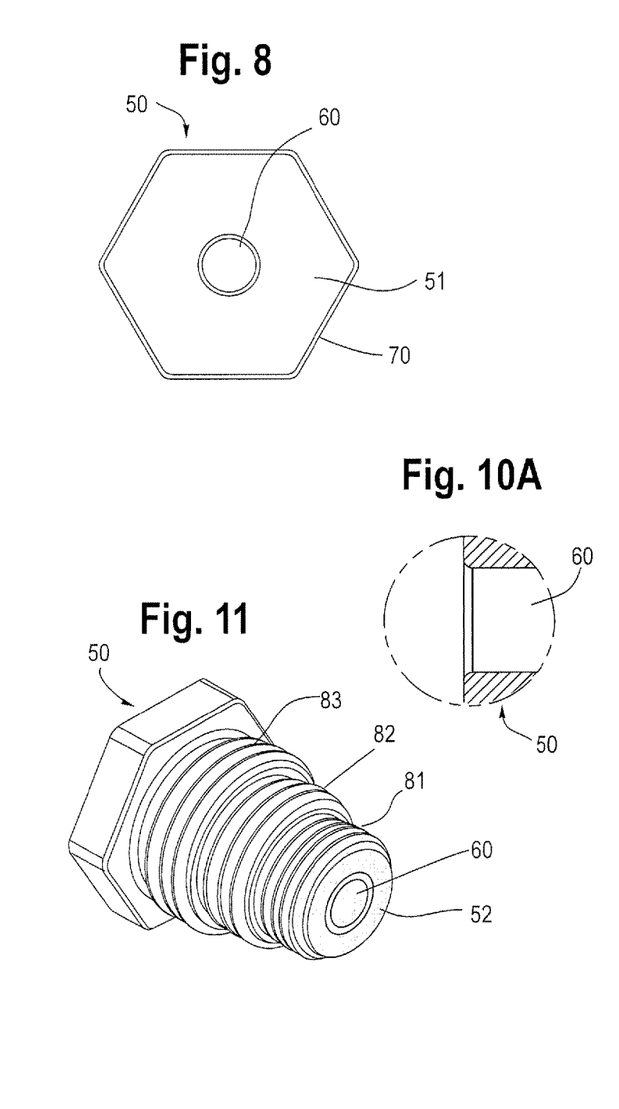
FIG. 8 is a top view of the dispensing adapter.
FIG. 10A is a close-up side elevation cross-sectional view of the top of the dispensing adapter.
FIG. 11 is a perspective view of the dispensing adapter.
Figure 9:
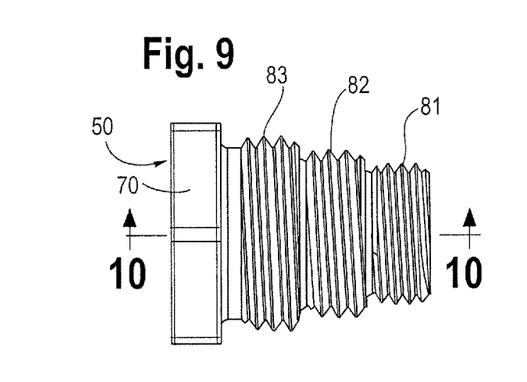
FIG. 9 is a side elevation view of the dispensing adapter.
Figure 10:
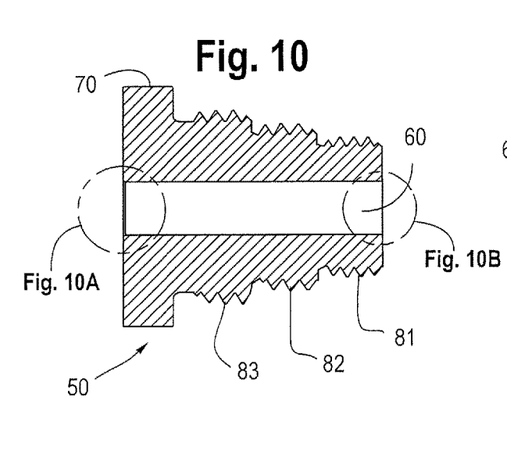
FIG. 10 is a cross-sectional view side elevation of the dispensing adapter.
Figure 10B:
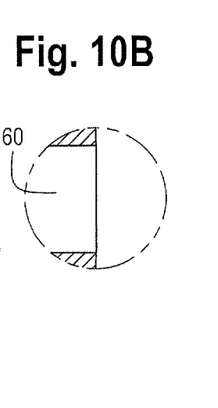
FIG. 10B is a close-up side elevation cross-sectional view of the bottom of the dispensing adapter.
Figure 12:
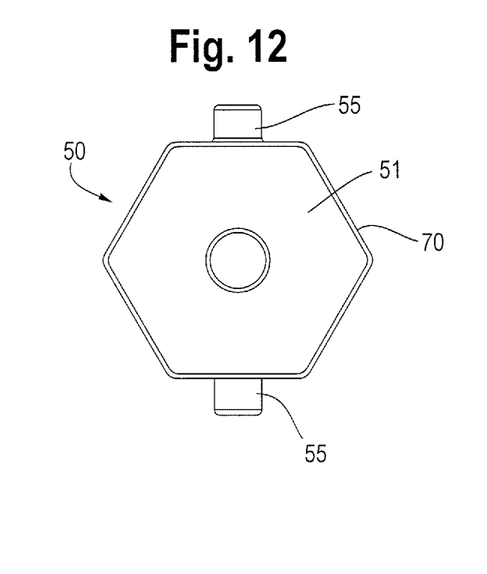
FIG. 12 is top view of an alternate embodiment of the dispensing adapter.
Figure 13:
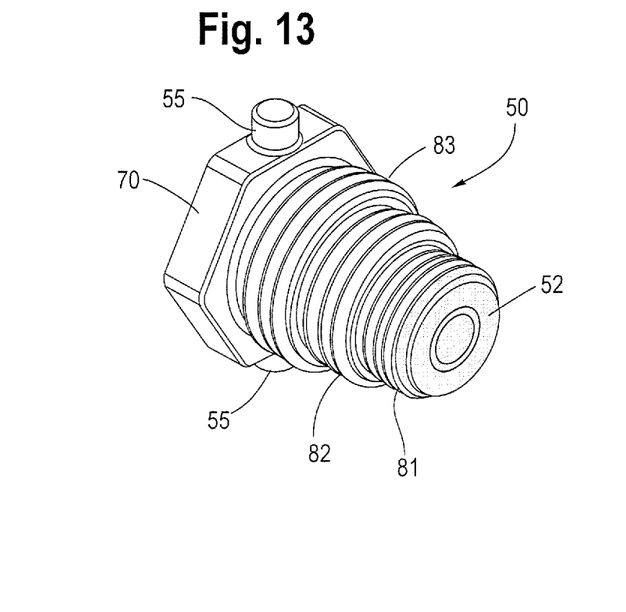
FIG. 13 is perspective view of an alternate embodiment of the dispensing adapter.
Figure 14:
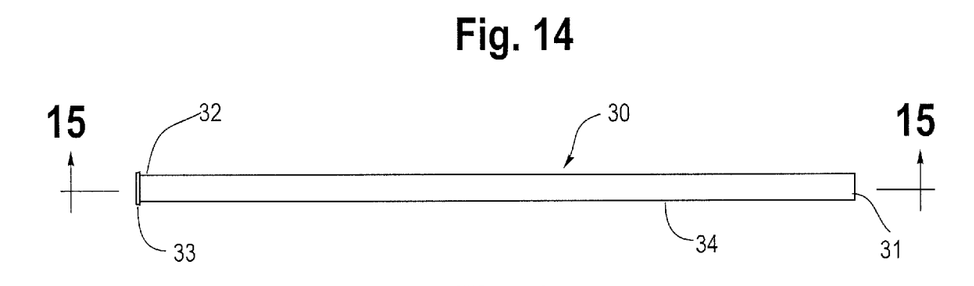
FIG. 14 is a side elevational view of the dispensing tube.
Figures 15, 15A:
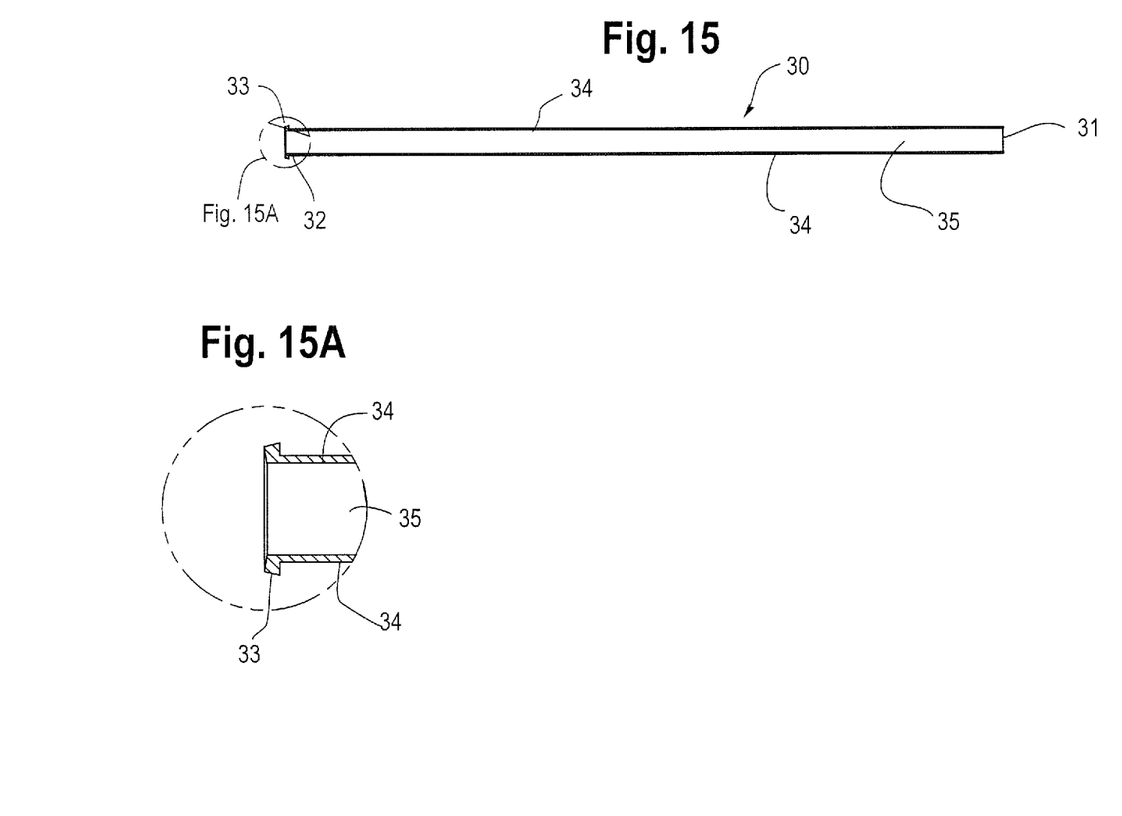
FIG. 15 is a cross-sectional side elevation view of the dispensing tube.
FIG. 15A is a close-up of the cross-section side elevation view of the first end of the dispensing tube.

As shown in FIGS. 4 and 5, the dispensing adapter 50 fits over the area of the dispensing tube 30 proximate to this second end 32 of the dispensing tube 30. In the most preferred embodiment, the dispensing adapter 50 is fixed in position on the dispensing tube 30 such that the dispensing adapter 50 cannot move axially along the length of dispensing tube 30. This placement may be achieved by crimping or creating a protrusion on the wall 34 of the dispensing tube 30 proximate to the top 51 of the dispensing adapter 50. In other embodiments, the dispensing adapter 50 may be fixed or attached on the dispensing tube 30 by making the central aperture 60 of the dispensing adapter 50 close to the diameter of the dispensing tube 30 resulting in a friction fit. In still other embodiments, an adhesive may be used to fix or attach the dispensing adapter 50 the dispensing tube 30. In other embodiments, the dispensing tube 30 and dispensing adapter 50 may be made as a unitary or singular structure.

In other embodiments of the invention, the dispensing adapter 50 may be connected to the valve 21 of the fluid container 20, so that the fluid may be communicated from the fluid container 20 to the dispensing adapter 50 without the need for the fluid to be communicated through a dispensing tube. Such an embodiment is shown in FIGS. 6,7, and 22-24. In such an embodiment, the central aperture 60 of the dispensing adapter 50 can be in direct fluid communication with the valve 21 of the fluid container 20. In some embodiments, the fluid container 20 and the dispensing adapter 20 are rotationally coupled, so that rotation of the fluid container 20 about a central axis also rotates the dispensing adapter 50 about a central axis, typically the central aperture 60. The rotational coupling allows the user to manipulate or rotate the fluid container 20 to also thread the dispensing adapter 50 into and out of the spark plug hole.

In some embodiments, the dispensing tube 30 may include a flare 33 at the second end 32 of the dispensing tube 30 to retain the dispensing adapter 50 on the dispensing tube 30. Such flare 33 preferably has a diameter greater than the diameter of the central aperture 60 of the dispensing adapter 50. The flare allows the dispensing adapter 50 to be retained on the dispensing tube 30.

The dispensing adapter 50 in some embodiments may include tool bearing surfaces 70 to allow a user to rotate the dispensing adapter 50, to allow the dispensing adapter 50 to be threaded into the threads of a spark plug hole of an internal combustion engine. In such embodiments, it may be preferable to allow the dispensing adapter 50 to rotate freely about the dispensing tube 30. In such embodiments it may also be preferable to allow the dispensing adapter 50 to rotate about the dispensing tube 30 and also allow the dispensing adapter 50 move axially along the dispending tube 30. In is also preferable that the dispensing adapter 50 be limited in its axial movement towards the fluid container 20 by the grip 40 or other structure.

As shown in FIGS. 22-24, the dispensing assembly including the container 20 and grip 45 are sized to fit inside a tool 100. The tool 100 is a hollow structure that receives the head nut or tool bearing surface 70 of the adapter 50, as well as the container 20, and grip 50. The length of the tool 100 is long enough to at least partially hold the container 20 when the tool bearing surface 70 or the boss 55 is engaged by the tool 100, but not so long as to deny a user easy access to the container 20. It is preferred that the tool length allow the user to press on the end of the container 20 to cause an axial displacement of the container 20 towards the grip 50, causing the valve 21 to open and allowing fluid to expel from the container 20.

While FIGS. 4 and 5 show the dispensing tube 30 that extends through the central aperture 60 of the dispensing adapter 50, such construction is not necessary for practicing of the invention. In other embodiments, it is sufficient that the second end 32 of the dispensing tube 30 is in fluid communication with the central aperture 60 of the dispensing adapter 50. Similarly, in embodiments where there is no dispensing tube 30, it is sufficient that the central aperture 60 of the dispensing adapter 50 is in fluid communication with the fluid container, most preferably the nozzle 21 of the fluid container 20.

In operation, the user removes the spark plug from the engine cylinder the user desires to put oil or other fluid into. The user then grasps the fluid dispensing system 10 and moves the dispensing adapter 50 toward the spark plug hole. The dispending adapter 50 is then inserted into the spark plug hole, engaging the threads of the appropriately sized threaded section of the dispensing adapter 50. The user then twists or screws in the adapter using a tool such as a deep-well socket, or by applying force to the body or to the tool engagement surfaces 70 with the user's fingers until the dispensing adapter is seated in the hole. The user then can dispense the fluid from the fluid container 20 in one of two ways. The user can axially displace the dispensing tube 30 by moving the dispensing tube 30 toward the fluid container 20 by manipulating the dispensing tube directly or by the grip 40. In a second manner, the user may axially displace the dispensing tube 30 toward the fluid container 20 by moving the fluid container 20 toward the dispensing adapter 50, allowing the dispensing tube 30 to slide within the central aperture 60, allowing the grip 40 or other protrusion on the dispending tube 30 to contact the top 51 or other surface of the dispensing adapter 50. Further movement of the fluid container 20 towards the dispensing adapter 50 will then cause the valve 21 to open and dispense fluid from the fluid container 20.

The user dispenses the fluid from the fluid container until fluid is no longer expelled, thereby delivering the desired premeasured amount of fluid to the cylinder. The user can then allow the dispensing system 10, or a portion of the dispensing system 10, such as the dispensing adapter 50 and dispensing tube 30, to remain in the spark plug hole during the storage period to act as an indicator that the cylinder has been prepared for storage or otherwise treated.

The foregoing disclosure of specific embodiments is intended to be illustrative of the broad concepts comprehended by the invention and is no way intended to be limiting upon the disclosure.

The invention claimed is:

1. An assembly for dispensing a fluid, the assembly including:
   a tube having a first end in fluid communication with a second end;
   a grip located on an exterior surface of the tube, at a distance from the first end of the tube, the grip including a portion that extends perpendicularly from an axis of the tube;
   an adapter for placing the second end of the tube in fluid communication with an aperture, the adapter including a first portion sized to fit a first diameter aperture, and a second portion to fit a second diameter aperture,
   wherein the adapter first portion has a first set of threads and the second adapter portion has a second set of threads, the first set of threads having a diameter that is smaller than the second set of threads, the second set of threads being nearer the first end of the tube than the first set of threads,
   the adapter including a head nut, the head nut located closer to the first end of the tube than the first set of threads.

2. The assembly of claim 1, wherein the grip is a disk that surrounds the tube.

3. The assembly of claim 1, further including a container for expelling fluid, the container in fluid communication with the first end of the tube.

4. The assembly of claim 1, where in the adapter includes an axial conduit for receiving the second end of the tube, the first set of threads wound about an axis aligned with the axial conduit, and the second set of threads wound about the axis aligned with the axial conduit.

5. The assembly of claim 4, wherein the first set of threads are sized to be received by a first sparkplug hole of a first engine, and the second set of threads are sized to be received by a second sparkplug hole of a second engine.

6. The assembly of claim 5 further including a container in fluid communication with the first end of the tube, wherein the container contains oil, the amount of oil corresponding to the amount of oil needed to prepare a cylinder of the first engine for storage.

7. The assembly of claim 5, wherein the adapter is in sealing engagement with the first sparkplug hole of the first engine when threaded into the first sparkplug hole of the first engine.

8. An assembly for the dispensing of a fluid, the assembly including a container for selectively expelling a fluid, a fluid conduit in fluid communication with the container, and an adapter in fluid communication with the fluid conduit and having an outlet for expelling fluid, the adapter including a first threaded portion, a second threaded portion, and a head nut.

9. The assembly of claim 8, wherein the first threaded portion is threaded to fit a first sparkplug hole of a first engine, and the second threaded portion is threaded to fit a second sparkplug hole of a second engine.

10. The assembly of claim 8, further including a grip positioned about the fluid conduit, the grip including a protrusion extending radially from the fluid conduit.

11. The assembly of claim 8, the head nut including a boss extending radially from the head nut.

12. The assembly of claim 11, the adapter including a third threaded portion, the third threaded portion threaded to fit a third sparkplug hole on a third engine, the first, second, and third threaded portions being axially aligned.

13. The assembly of claim 12, wherein the first, second, and third threaded portions are external threads.

\* \* \* \* \*